United States Patent
Kim

(10) Patent No.: US 6,587,176 B2
(45) Date of Patent: Jul. 1, 2003

(54) DISPLAY DEVICE COMPRISES A PLURALITY OF FIRST DATA DRIVE CIRCUITS CONNECTED TO N DATA LINES AND SECOND DATA DRIVING CIRCUIT CONNECTED TO M DATA LINES, WHEREIN M<N

(75) Inventor: Jeom-Jae Kim, Seoul (KR)

(73) Assignee: LG.Philips LCD Co., Ltd.,, Seoul (KR)

( * ) Notice: Subject to any disclaimer, the term of this patent is extended or adjusted under 35 U.S.C. 154(b) by 350 days.

(21) Appl. No.: 09/756,171

(22) Filed: Jan. 9, 2001

(65) Prior Publication Data

US 2001/0020995 A1 Sep. 13, 2001

(30) Foreign Application Priority Data

Mar. 2, 2000 (KR) .......................................... 2000-10300

(51) Int. Cl.[7] ............................................. G02F 1/1345
(52) U.S. Cl. ...................... 349/149; 349/150; 349/152
(58) Field of Search .................................. 349/149–152

(56) References Cited

U.S. PATENT DOCUMENTS

| 5,499,131 | A | * | 3/1996 | Kim ............................. 349/149 |
| 5,555,116 | A | * | 9/1996 | Ishikawa et al. ............. 349/149 |
| 5,946,063 | A | | 8/1999 | Izumi ........................... 349/73 |
| 6,052,169 | A | * | 4/2000 | Kim ............................ 349/148 |

* cited by examiner

Primary Examiner—Julie Ngo
(74) Attorney, Agent, or Firm—McKenna, Long and Aldridge

(57) ABSTRACT

A display device having a display region with a plurality of data lines, a pad region with a plurality of pads that electrically connect to terminal lines, a wiring region with a plurality of leadout lines that interconnect the terminal lines to the data lines, a plurality of first data drivers, each having N channels that electrically connect to N terminal lines. The display device further includes a second data driver having N channels that connects to M terminal lines, where M is less than N. The first data drivers are spaced apart by equal intervals and each of the first data drivers are centered on N data lines. The second data driver is spaced an interval apart from a first data driver that is less than the intervals between the first data drive circuits.

18 Claims, 4 Drawing Sheets

DISPLAY DEVICE COMPRISES A PLURALITY OF FIRST DATA DRIVE CIRCUITS CONNECTED TO N DATA LINES AND SECOND DATA DRIVING CIRCUIT CONNECTED TO M DATA LINES, WHEREIN M<N

This application claims the benefit of Korean Patent Application No. 2000-10300, filed on Mar. 2, 2000, which is hereby incorporated by reference for all purposes as if fully set forth herein.

BACKGROUND OF THE INVENTION

1. Field of the Invention

The present invention relates to liquid crystal displays (LCD). More particularly it relates to an improvement in the LCD lines which drive the liquid crystal cells to display information.

2. Discussion of the Related Art

An LCD device comprises an LCD panel having upper and lower substrates that are spaced apart and opposed to each other and that have a liquid crystal layer there between. The upper substrate includes a color filter layer and a common electrode formed on the color filter layer. The lower substrate includes a switching element, such as a thin film transistor (TFT), and a pixel electrode.

The common electrode and the pixel electrode apply an electric field across the liquid crystal layer. The TFT serves to operate the pixel electrode using signals from an external drive circuit. The TFT includes a gate electrode, a source electrode, and a drain electrode. The gate electrode is connected to a gate line, the source electrode is connected to a data line, and the drain electrode is connected to the pixel electrode. The gate and source electrodes are connected to the external drive circuits through gate and data pads, respectively, formed at their terminals.

The external drive circuit comprises a gate drive circuit that drives the gate electrode and a data drive circuit that drives the source electrode. Techniques for connecting the drive circuit to the LCD panel include WB (wire bonding), COB (chip on board), TAB (tape automated bonding), and COG (chip on glass).

For a low resolution LCD it is easy to connect drive circuit leads on a PCB (printed circuit board) to the LCD panel since the number of leads is small. However, for a high resolution LCD, it is not so easy to connect drive circuits having a large number of leads to a PCB. For example, an LCD having a resolution of 600×800 (SVGA) has 600× 800×3 pixels, which are all connected to drive circuits and thus requires an involved connecting process.

The TAB technique has been introduced to address the problem described above. FIG. 1 shows a typical TAB technique. As shown in FIG. 1, a tape carrier 53 has a drive circuit 51 mounted thereon. The package in which the drive circuit is mounted on the tape carrier is referred to as a TCP (tape carrier package). In other words, a TCP 50 has the drive circuit 51. The LCD panel 20 and the PCB 52 are connected to the drive circuit 51 through the tape carrier 53. The TAB technique uses an inner lead bonding (ILB) process that connects the tape carrier to the chip using heat and pressure, and an encapsulation process that applies an epoxy-based resin on the chip. The TAB technique also includes an outer lead bonding (OLB) process that connects the outer leads to the pads on the PCB 52 and to the gate or data pads on the substrate, respectively.

Referring now to FIG. 2, gate drive circuits 100G are placed along the left side of the LCD panel, and data drive circuits 100D are placed across both the upper and lower sides of the LCD panel. Such a structure is referred to as a dual-bank structure. For an LCD having a resolution of 1600×1200×3 (UXGA), each of the typical data drive circuits 100D has 384 channels that can control 384 data lines. The number of the data and gate lines is thus 1600×3 and 1200, respectively. Therefore, 14 drive circuits are required to control all of the 1600×3 data lines. In the conventional dual-bank structure, seven drive circuits are arranged across both the upper and lower sides of the LCD panel, respectively. The seven data drive circuits mounted on the lower portion are connected to 2400 data lines. The data drive circuits D1 to D6 are each connected to 384 data lines, but the outmost data drive circuit D7 is connected to only 96 data lines. As shown in FIG. 2, the intervals between adjacent drive circuits are all "a" and the seven data drive circuits are symmetrically arranged with respect to the center line "C" of the LCD panel 20. However, as explained in more detail below, when the intervals between the data drive circuits are all equal a resistance difference occurs in the wiring region (see FIG. 4).

FIG. 3 is an enlarged view illustrating a portion F1 of FIG. 2. Each data line has a display line d-n located on a display region (d-384 and d-385 are shown), a leadout line L-n located on a wiring region (L-384 and L-385 are shown), and a terminal line T-n located on a pad region (T-384 and T-385 are shown). Each terminal line T-n connects to a corresponding data drive circuit. As shown in FIG. 3, the last data line d-384 of a data drive circuit D1 and the first data line d-385 of a data drive circuit D2 have almost the same wiring distance. That is, the readout line L-384 and the leadout line L-385 have almost the same length. However, this is not the case in portion F2, shown in FIG. 4, which is an enlarged view of portion F2 of FIG. 2.

In FIG. 4, the last leadout line L-2304 connected to a data drive circuit D6 and the first leadout line L-2305 connected to a data drive circuit D7 differ significantly in length, resulting in a resistance difference between the leadout line L-2304 and L-2305. Such a resistance difference between adjacent leadout lines causes shadowing (uneven brightness) and distortions (such as deformations of liquid crystal drive waveforms and crosstalk).

FIG. 5 shows a simplified LCD panel having only 14 data lines, with each data drive circuit having only three channels. As shown, as a data drive circuit is positioned farther away from the first data drive circuit D1, the difference in length between the leadout lines of adjacent last and first data lines becomes greater. Namely, if all intervals between adjacent data drive circuits are equal, and if the data drive circuits are symmetrical about the center of the display, the lengths of the leadout lines of the last data lines become greater as a data drive circuit is positioned farther from the first data drive circuit D1. This causes a resistance difference between the readout lines of the adjacent last and first data lines. With regard to FIG. 5, the greatest difference in length between adjacent leadout lines occurs between the leadout line of the last data line connected to the data drive circuit D4, specifically data line d-12, and the leadout line of the first data line connected to data drive circuit D5, specifically d-13.

To alleviate display distortions due to resistance differences described above, one technique employs a method of adjusting the widths of the data lines to compensate for the RC (Resistance×Capacitance) delay. See U.S. Pat. No. 5,757,450. However, for a high resolution LCD device with a large number of data lines, it is rather difficult to accurately design and fabricate the data lines to compensate for the RC delay.

The problem described above results from the outermost data drive circuit having more channels than data lines. For example, the outermost data drive circuit D5 of FIG. 5 has three channels but connects to only two data lines. Such a problem could be addressed by employing data drive circuits in which all channels connect to a data line. For example, a liquid crystal display conceivably could use data drive circuits having 300 channels each to drive 4800 data lines. However, 16 data drive circuits would be required, leading to high production costs due to the additional data drive circuits and to their interconnections. Furthermore, data drive circuits with 300 channels would have to be designed and manufactured to replace those currently existing. Therefore, a display having reduced distortions caused by wiring resistance differences would be beneficial.

SUMMARY OF THE INVENTION

Accordingly, the present invention is directed to a display device that substantially obviates one or more of the problems due to limitations and disadvantages of the related art.

An advantage of the present invention is that it can provide a display device having good display characteristics. Beneficially, that display device is a liquid crystal display device or an X-ray display device that includes data lines driven by display drivers.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, is a display device having a display region with a plurality of data lines, a pad region with a plurality of pads that electrically connect to terminal lines, a wiring region with a plurality of leadout lines that interconnect the terminal lines to the data lines, a plurality of first data drivers, each having N channels that electrically connect to N terminal lines. The display device further includes a second data driver having N channels that electrically connect to M terminal lines, where M is less than N. The first data drivers are spaced apart by equal intervals and each of the first data drivers are centered on N data lines. The second data driver is spaced from an adjacent first data driver by an interval that is less than the intervals between the first data drive circuits.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF AN EMBODIMENT OF THE INVENTION

Reference will now be made in detail to an embodiment of the present invention, the example of which is illustrated in the accompanying drawings.

Figure 1:
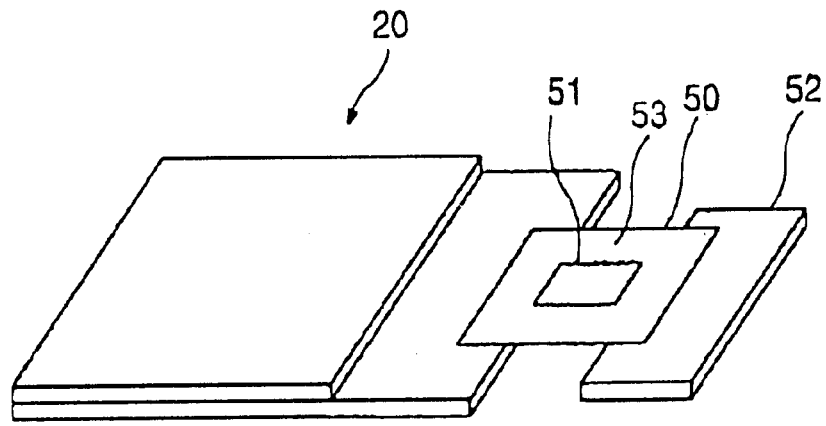
FIG. 1 is a schematic perspective view illustrating a typical TAB technique.
Figure 2:
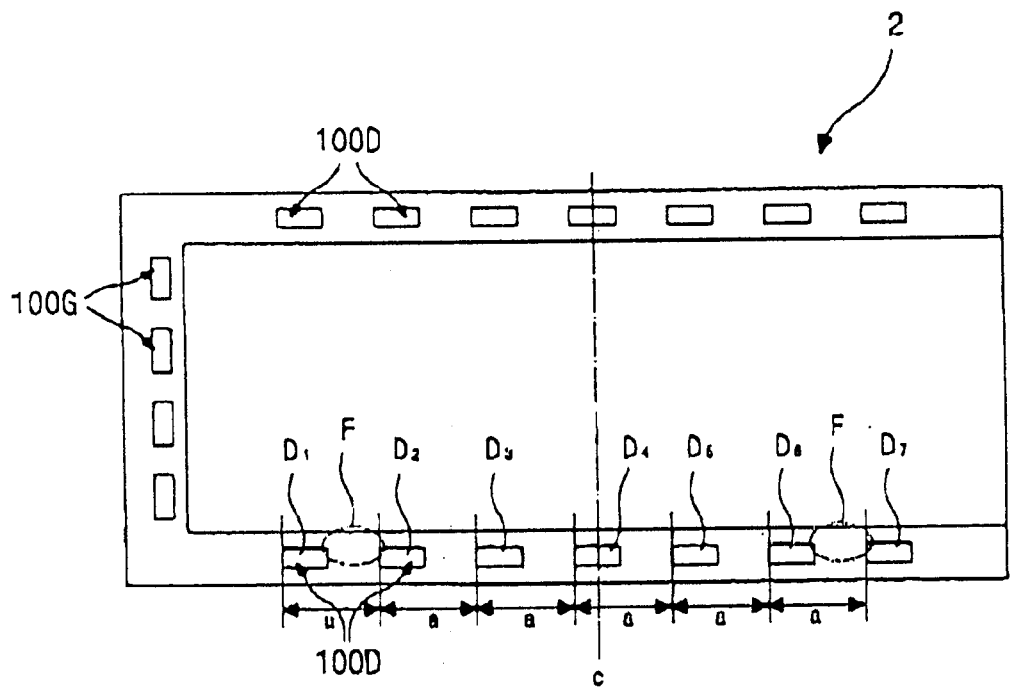
FIG. 2 is a plan view illustrating a conventional liquid crystal display device of a dual-bank drive circuit structure.
Figure 3:
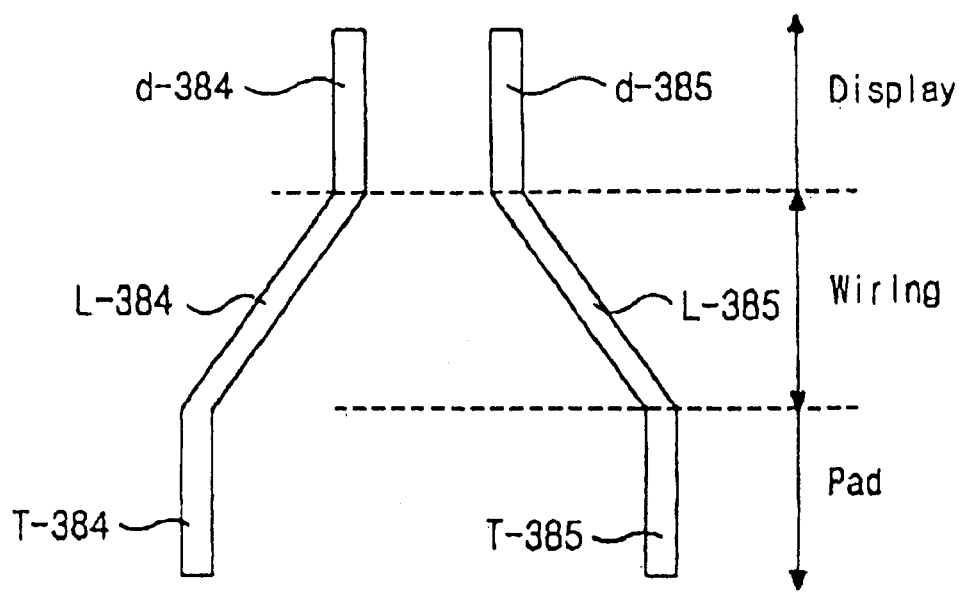
FIG. 3 is an enlarged view illustrating a portion "F1" of FIG. 2.
Figure 4:
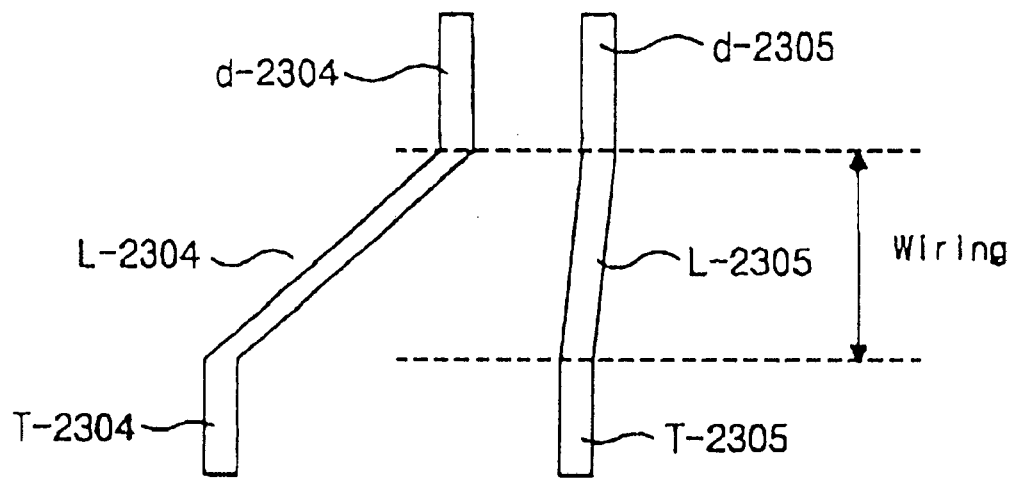
FIG. 4 is an enlarged view illustrating a portion "F2" of FIG. 2.
Figure 5:
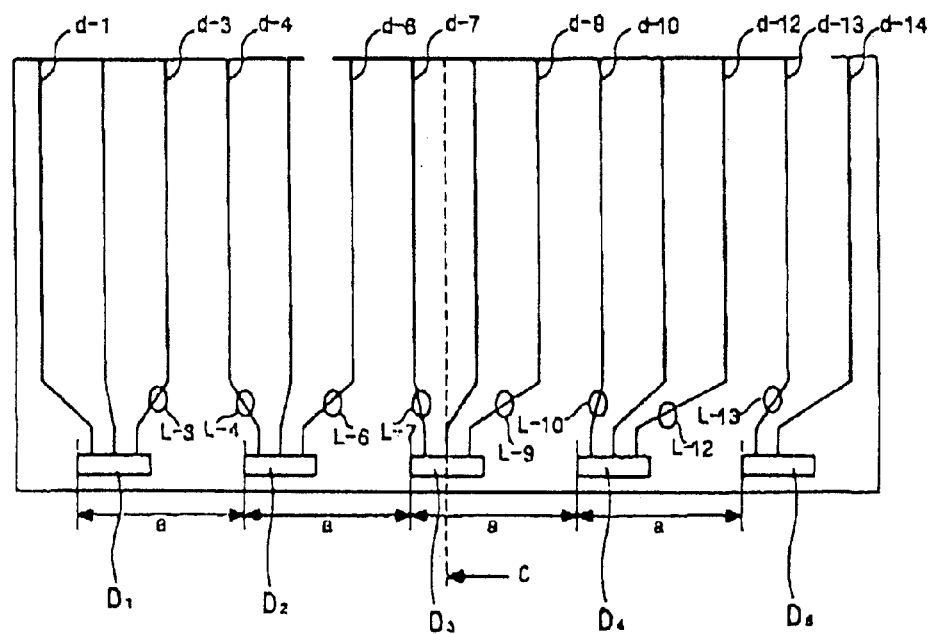
FIG. 5 is a partial plan view illustrating a conventional liquid crystal display device in which data lines are connected to corresponding drive circuits.
Figure 6:
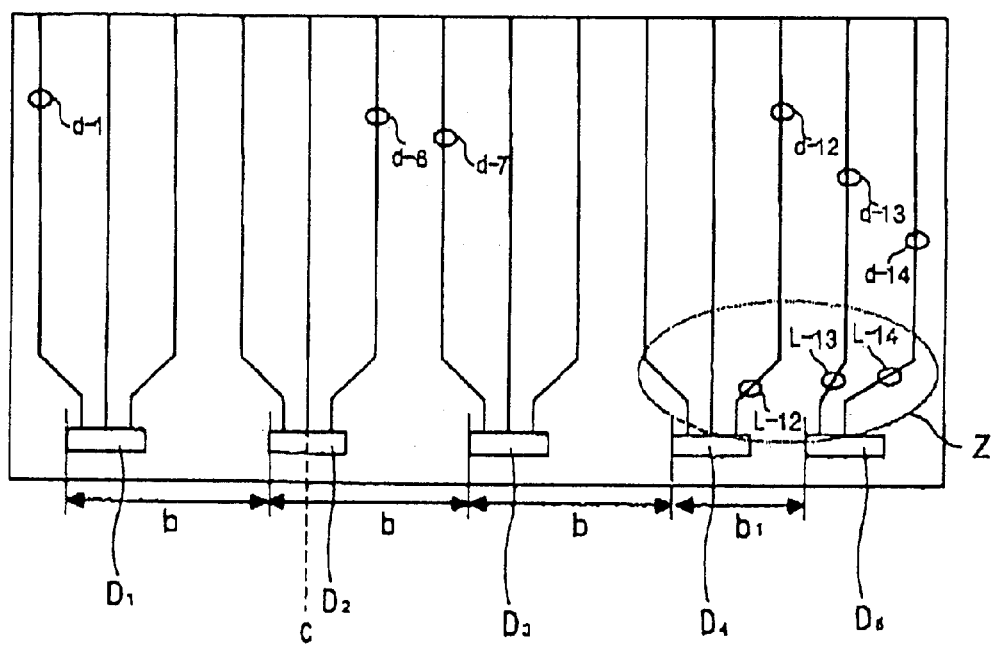
FIG. 6 is a partial plan view illustrating a simplified liquid crystal display device in which data lines are connected to corresponding drive circuits in accordance with the principles of the present invention.
Figure 7:
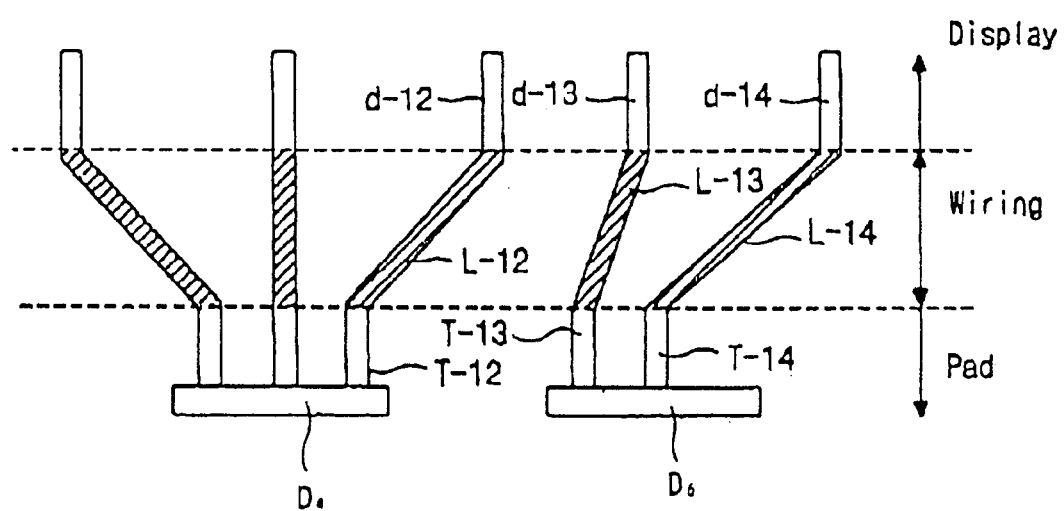
FIG. 7 is an enlarged view illustrating a portion "Z" of FIG. 6.

FIG. 6 is a plan view illustrating a simplified liquid crystal display device in which data lines are electrically connected to drive circuits according to the principles of the present invention. FIG. 6 shows 14 data lines and five data drive circuits, with each drive circuit having three channels. FIG. 7 is an enlarged view of a portion "Z" of FIG. 6. As shown, each data line d-n is located on a display region, each leadout line L-n is located on a wiring region, and each terminal line T-n is located on a pad region. The terminal lines T-n are electrically connected to the data drive circuits.

Referring to FIGS. 6 and 7, each of the data drive circuits D1 to D4 is electrically connected to data lines that are symmetrical with respect to a central line C of the respective data drive circuit. All of the data drive circuits D1 to D4 have the same number, N, of channels and connected data lines. For example, as shown in FIG. 6, the data drive circuits D1 to D4 each have three channels and each is connected to three data lines, respectively. However, the outermost data drive circuit D5 has the same number of channels, but is only connected to two data lines, the lines d-13 and d-14. Furthermore, as shown in FIG. 6 the intervals between the data drive circuits D1 to D4 are all equal to "b", whereas the interval between the data drive circuit D4 and D5 is "b1", which is not equal to "b". As shown, "b1" is smaller than "b".

The data drive circuits D1 to D4 have data lines whose readout lines have the same widths in the wiring region. This is acceptable because the data lines of each data drive circuit are symmetrically arranged about a central line "C". This enables an improved display quality without any compensating design. A reason it is acceptable to have leadout lines with the same width is because the data lines are densely arranged and thus adjacent data lines have almost the same leadout line length. Any resistance difference between adjacent data lines is minor and does not noticeably affect display quality.

However, the readout lines L-13 and L-14 that connect to the data drive circuit D5 through the terminal lines T-13 and T-14, respectively, may be designed to compensate for differences in resistance. For example, the widths of the readout lines L-13 and L-14 can be adjusted to compensate for a wiring resistance difference. The widths of the leadout lines L-13 and L-14 are preferably adjusted with reference to the leadout line L-12 so as to minimize a resistance difference between adjacent leadout lines L-12 and L-13. The adjusted widths of the leadout lines L-13 and L-14 are preferably substantially the same. Therefore, it is easy to design the leadout lines to improve the display quality.

Equation (1) shows a relationship between resistance R, length L and area A.

$$R = \rho \frac{L}{A} \qquad \text{Equation (1)}$$

where "R" is a resistance, "L" is a length, "p" is a resistivity and "A" is a sectional area of a conductor. As described in Equation (1), the resistance "R" is proportional to length "L" but is inversely proportional to area "A". Using Equation (1), the widths of the leadout lines L-13 and L-14 can be adjusted to minimize a wiring resistance difference between the leadout lines L-12 and L-13.

Since the leadout line L-13 is shorter than the readout line L-12, the readout line L-13 is adjusted to have a narrower width than the leadout line L-12 to match the resistances. Therefore, the RC time delays of the data lines d-12 and d-13 are almost the same, thereby improving display characteristics.

As an example, for an LCD devices having a resolution of UXGA, XGA and the like, the leadout lines of the data drive circuits having the same number of channels as connected data lines have a width of about 20 to 25 μm and preferably about 20 μm. Furthermore, the leadout lines of the data drive circuit having more channels than connected data lines have a width of about 14 to 19 μm and preferably about 17 μm.

In the embodiment illustrated in FIG. 6 and FIG. 7 there are 14 data lines with 3 channels per data drive circuit. However, that illustrated embodiment is provided for the sake of simplicity. The general principles of the present invention can be applied to LCD devices having different resolutions, including UXGA and XGA. For example, when a drive circuit having 384 channels is used in an LCD device of UXGA resolution, the 6 data drive circuits connected to data lines 1 to 2304 are arranged to have equal intervals between adjacent data drive circuits, while the outermost data drive circuit is arranged with a shorter interval between it and its adjacent data drive circuit. Further, only the width of the readout line of the first data line connected to the outermost data drive circuit is adjusted to compensate for a wiring resistance difference between the first data line of the outermost data drive circuit and the last data line of the adjacent data drive circuit. Adjusted widths of the data lines 2305 to 2400 of the outermost data drive circuit are the same.

When compared with a conventional UXGA LCD where all data drive circuits are arranged with equal intervals and where the leadout lines have different widths to compensate for resistance differences between adjacent data lines, the present invention compensates only the leadout line connected to the outermost data drive circuit, the one having more channels than connected data lines. Thus, it is easier in the present invention to precisely design the data lines, allowing for a stable, improved display.

While the foregoing has generally described a visible-light liquid crystal display, the principles of the present invention are broader than that application. For example, the principles of the present invention may be used with X-ray detector arrays that incorporate thin film transistor as a switching elements. Other displays may also benefit from the principles of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a liquid crystal panel having a display region with a plurality of gate lines arranged in one direction and a plurality of data lines arranged in a direction perpendicular to the gate lines, the liquid crystal display panel further including a wiring region having leadout lines and a pad region having terminal lines, wherein the leadout lines electrically connect the data lines to the terminal lines;
   a plurality of gate drive circuits connected to the gate lines;
   a plurality of data drive circuits connected to the terminal lines, wherein the plurality of data drive circuits includes a plurality of first data drive circuits and a second data drive circuit, wherein each of the first data drive circuits has N channels that electrically connect to N data lines through N leadout lines, wherein the second data drive circuit has N channels connected to M data lines through M leadout lines, wherein M is less than N, wherein a first interval exists between adjacent first data drive circuits, wherein a second interval exists between a first data drive circuit and the second data drive circuit, and wherein the second interval is less than the first interval.

2. The liquid crystal display device of claim 1, wherein the leadout lines connected to the first data drive circuits have a same width.

3. The liquid crystal display device of claim 1, wherein the M readout lines are narrower than the leadout lines connected to the first data drive circuits.

4. The liquid crystal display device of claim 1, wherein each readout line connected to the first data drive circuits is about 20 to 25 μm wide.

5. The liquid crystal display device of claim 1, wherein the M readout lines are each about 14 to 19 μm in width.

6. The liquid crystal display device of claim 1, wherein the N data lines connected to each of the first data drive circuits are symmetrically centered on the first data drive circuit to which they connect.

7. A display device, comprising:
   a display region having a plurality of data lines;
   a pad region having a plurality of pads and a plurality of terminal lines, wherein each pad electrically connects to an associated terminal line;
   a wiring region having a plurality of readout lines that electrically connect the terminal lines to the data lines;
   a plurality of first data drivers mounted on a plurality of pads such that, each if the first data drivers is spaced apart from an adjacent first data driver by a first interval wherein each of the first data drivers has N channels that electrically connect to N data lines via N terminal lines and N readout lines; and
   a second data driver mounted on a plurality of pads such that the second data driver is spaced apart from an adjacent first data driver by a second interval, said second data driver having N channels that electrically connect to M data lines via M terminal lines and M leadout lines, wherein M is less than N, and wherein the second interval is less than the first interval.

8. A display device according to claim 7, wherein each of said first data drivers is symmetrically centered on N data lines.

9. A display device according to claim 8, wherein each of said first data drivers is symmetrically centered on the N data lines to which they connect.

10. A display device according to claim 7, wherein the N readout lines all have the same width.

11. A display device according to claim 10, wherein the M readout lines are narrower than the N leadout lines.

12. A display device according to claim 10, wherein the N readout lines are about 20 to 25 μm wide.

13. A display device according to claim 11, wherein the M readout lines are about 14 to 19 μm wide.

14. A display device according to claim 7, wherein the display device is a liquid crystal display device.

15. A display device according to claim 7, wherein said data lines connect to a thin film transistor.

16. A display device according to claim 7, wherein said display region further includes a plurality of gate lines.

17. A display device according to claim 7, wherein the display device is a X-ray display device.

18. A display device according to claim 17, wherein said data lines connect to a thin film transistor.

* * * * *